(12) United States Patent
Cullen et al.

(10) Patent No.: US 8,516,054 B2
(45) Date of Patent: Aug. 20, 2013

(54) MESSAGE HANDLING

(75) Inventors: William M. Cullen, Cambridge, MA (US); David A Chappell, Marlborough, MA (US)

(73) Assignee: Aurea Software, Inc., Austin, TX (US)

( * ) Notice: Subject to any disclaimer, the term of this patent is extended or adjusted under 35 U.S.C. 154(b) by 2204 days.

(21) Appl. No.: 09/993,865

(22) Filed: Nov. 14, 2001

(65) Prior Publication Data

US 2002/0078132 A1 Jun. 20, 2002

Related U.S. Application Data

(60) Provisional application No. 60/257,313, filed on Dec. 20, 2000.

(51) Int. Cl.
*G06F 15/16* (2006.01)

(52) U.S. Cl.
USPC ............................ 709/206; 709/201; 709/214

(58) Field of Classification Search
USPC ................. 709/201, 202, 203, 204, 205, 206, 709/207, 214, 215, 216
See application file for complete search history.

(56) References Cited

U.S. PATENT DOCUMENTS

| | | | |
|---|---|---|---|
| 5,245,616 A | 9/1993 | Olson | |
| 5,392,398 A | 2/1995 | Meyer | |
| 5,596,720 A * | 1/1997 | Hamada et al. | 709/206 |
| 5,758,354 A | 5/1998 | Huang et al. | |
| 5,765,033 A | 6/1998 | Miloslavsky | |
| 5,805,825 A * | 9/1998 | Danneels et al. | 709/243 |
| 5,822,526 A | 10/1998 | Waskiewicz | |
| 5,850,525 A * | 12/1998 | Kalkunte et al. | 709/235 |
| 5,857,201 A | 1/1999 | Wright, Jr. et al. | |
| 5,870,605 A | 2/1999 | Bracho et al. | 395/682 |
| 5,870,761 A * | 2/1999 | Demers et al. | 1/1 |
| 5,878,056 A * | 3/1999 | Black et al. | 714/748 |
| 5,951,648 A * | 9/1999 | Kailash | 709/237 |
| 6,016,515 A | 1/2000 | Shaw et al. | |
| 6,061,559 A | 5/2000 | Eriksson et al. | |
| 6,091,724 A | 7/2000 | Chandra et al. | |
| 6,112,323 A | 8/2000 | Meizlik et al. | 714/748 |
| 6,128,646 A | 10/2000 | Miloslavsky | |
| 6,145,781 A | 11/2000 | Kawabe et al. | |
| 6,167,445 A | 12/2000 | Gai et al. | |
| 6,289,212 B1 * | 9/2001 | Stein et al. | 455/412.1 |
| 6,298,455 B1 | 10/2001 | Knapman et al. | |
| 6,336,119 B1 | 1/2002 | Banavar et al. | |
| 6,359,635 B1 | 3/2002 | Perttunen | |
| 6,397,352 B1 * | 5/2002 | Chandrasekaran et al. | 714/16 |
| 6,452,934 B1 | 9/2002 | Nakata | |
| 6,453,346 B1 | 9/2002 | Garg et al. | |
| 6,484,198 B1 | 11/2002 | Milovanovic et al. | |
| 6,513,154 B1 | 1/2003 | Porterfield | |
| 6,597,774 B1 * | 7/2003 | Jennings et al. | 379/114.07 |

(Continued)

OTHER PUBLICATIONS

"A powerful new tool to help validated error-handling code," Nov. 2004, pp. 1-4, Compuware Corporation.

(Continued)

*Primary Examiner* — Dhairya A Patel (57) ABSTRACT

The disclosure includes a description of a method of handling messages received at a messaging system server. The method includes storing, in non-persistent storage, messages received from at least one client, removing delivered messages from the non-persistent storage, and saving messages stored in the non-persistent storage to persistent storage after a delay interval.

30 Claims, 9 Drawing Sheets

(56) References Cited

U.S. PATENT DOCUMENTS

| | | | |
|---|---|---|---|
| 6,643,682 B1 | 11/2003 | Todd et al. | |
| 6,647,544 B1 | 11/2003 | Ryman et al. | |
| 6,728,715 B1 | 4/2004 | Astley et al. | |
| 6,732,175 B1 | 5/2004 | Abjanic | |
| 6,782,386 B1 | 8/2004 | Gebauer | |
| 6,792,460 B2 | 9/2004 | Oulu et al. | |
| 6,801,604 B2 | 10/2004 | Maes et al. | |
| 6,807,636 B2 | 10/2004 | Hartman et al. | |
| 6,816,898 B1 | 11/2004 | Scarpelli et al. | |
| 6,854,088 B2 | 2/2005 | Massengale et al. | |
| 6,868,498 B1* | 3/2005 | Katsikas | 726/14 |
| 6,898,556 B2 | 5/2005 | Smocha et al. | |
| 6,901,447 B2 | 5/2005 | Koo et al. | |
| 6,944,662 B2 | 9/2005 | Devine et al. | |
| 6,970,945 B1 | 11/2005 | Berkman et al. | |
| 6,983,479 B1 | 1/2006 | Salas et al. | |
| 7,007,278 B2 | 2/2006 | Gungabeesoon | |
| 7,026,089 B2 | 4/2006 | Law et al. | |
| 7,039,701 B2 | 5/2006 | Wesley | |
| 7,096,263 B2 | 8/2006 | Leighton et al. | |
| 7,103,054 B2 | 9/2006 | Novaes | |
| 7,110,406 B1 | 9/2006 | Ennis et al. | |
| 7,171,628 B1 | 1/2007 | Perttunen | |
| 7,177,929 B2 | 2/2007 | Burbeck et al. | |
| 7,251,689 B2 | 7/2007 | Wesley | |
| 7,287,097 B1 | 10/2007 | Friend et al. | |
| 7,302,634 B2 | 11/2007 | Lucovsky et al. | |
| 7,334,022 B2 | 2/2008 | Nishimura et al. | |
| 7,349,980 B1 | 3/2008 | Darugar et al. | |
| 7,359,919 B2 | 4/2008 | Cohen et al. | |
| 7,379,971 B2 | 5/2008 | Miller et al. | |
| 7,386,630 B2 | 6/2008 | Liong et al. | |
| 7,395,349 B1 | 7/2008 | Szabo et al. | |
| 7,406,440 B2 | 7/2008 | Napier et al. | |
| 7,406,537 B2 | 7/2008 | Cullen | |
| 7,418,501 B2 | 8/2008 | Davis et al. | |
| 7,433,835 B2 | 10/2008 | Frederick et al. | |
| 7,464,154 B2 | 12/2008 | Dick et al. | |
| 7,467,196 B2 | 12/2008 | Di Luoffo et al. | |
| 7,487,510 B1 | 2/2009 | Carr | |
| 7,496,637 B2 | 2/2009 | Han et al. | |
| 7,512,957 B2 | 3/2009 | Cohen et al. | |
| 7,516,191 B2 | 4/2009 | Brouk et al. | |
| 7,533,172 B2 | 5/2009 | Traversat et al. | |
| 7,539,656 B2 | 5/2009 | Fratkina et al. | |
| 7,543,280 B2 | 6/2009 | Rosenthal et al. | |
| 7,603,358 B1 | 10/2009 | Anderson et al. | |
| 7,702,636 B1 | 4/2010 | Sholtis et al. | |
| 7,747,980 B2 | 6/2010 | Illowsky et al. | |
| 7,752,604 B2 | 7/2010 | Genkin et al. | |
| 7,761,847 B2 | 7/2010 | Kornerup et al. | |
| 7,801,946 B2 | 9/2010 | Bearman | |
| 7,801,976 B2 | 9/2010 | Hodges et al. | |
| 7,802,229 B2 | 9/2010 | Kornerup et al. | |
| 7,881,992 B1 | 2/2011 | Seaman et al. | |
| 7,887,511 B2 | 2/2011 | Mernoe et al. | |
| 7,895,262 B2 | 2/2011 | Nielsen et al. | |
| 7,941,542 B2 | 5/2011 | Broda et al. | |
| 7,992,102 B1 | 8/2011 | De Angelo | |
| 8,001,232 B1 | 8/2011 | Saulpaugh et al. | |
| 8,060,553 B2 | 11/2011 | Mamou et al. | |
| 2001/0007993 A1 | 7/2001 | Wu | |
| 2002/0010781 A1 | 1/2002 | Tuatini | |
| 2002/0026473 A1 | 2/2002 | Gourraud | |
| 2002/0107992 A1 | 8/2002 | Osbourne et al. | |
| 2002/0161826 A1 | 10/2002 | Arteaga et al. | |
| 2002/0165745 A1 | 11/2002 | Greene et al. | |
| 2003/0005174 A1 | 1/2003 | Coffman et al. | |
| 2003/0014733 A1 | 1/2003 | Ringseth et al. | |
| 2003/0041178 A1 | 2/2003 | Brouk et al. | |
| 2003/0055920 A1 | 3/2003 | Kakadia et al. | |
| 2003/0061404 A1 | 3/2003 | Atwal et al. | |
| 2003/0074579 A1 | 4/2003 | Della-Libera et al. | |
| 2003/0093500 A1 | 5/2003 | Khodabakchian et al. | |
| 2003/0101210 A1 | 5/2003 | Goodman et al. | |
| 2003/0106039 A1 | 6/2003 | Rosnow et al. | |
| 2003/0115317 A1 | 6/2003 | Hickson et al. | |
| 2003/0120665 A1 | 6/2003 | Fox et al. | |
| 2003/0135556 A1 | 7/2003 | Holdsworth | |
| 2003/0145281 A1 | 7/2003 | Thames et al. | |
| 2003/0172368 A1 | 9/2003 | Alumbaugh et al. | |
| 2003/0188198 A1 | 10/2003 | Holdsworth et al. | |
| 2003/0204644 A1 | 10/2003 | Vincent | |
| 2004/0027995 A1* | 2/2004 | Miller et al. | 370/254 |
| 2004/0030947 A1 | 2/2004 | Aghili et al. | |
| 2004/0034664 A1 | 2/2004 | Jain et al. | |
| 2004/0054770 A1 | 3/2004 | Touboul | |
| 2004/0078440 A1 | 4/2004 | Potter et al. | |
| 2004/0088140 A1 | 5/2004 | O'Konski et al. | |
| 2004/0133633 A1 | 7/2004 | Fearnley et al. | |
| 2004/0186817 A1 | 9/2004 | Thames et al. | |
| 2004/0193703 A1 | 9/2004 | Loewy et al. | |
| 2004/0216127 A1 | 10/2004 | Datta et al. | |
| 2004/0225724 A1 | 11/2004 | Pavlik et al. | |
| 2005/0027853 A1 | 2/2005 | Martin et al. | |
| 2005/0038708 A1 | 2/2005 | Wu | |
| 2005/0097480 A1 | 5/2005 | Care | |
| 2005/0289508 A1 | 12/2005 | Illowsky et al. | |
| 2006/0031303 A1* | 2/2006 | Pang | 709/206 |
| 2006/0031481 A1 | 2/2006 | Patrick et al. | |
| 2006/0041461 A1 | 2/2006 | Vucina et al. | |
| 2006/0041859 A1 | 2/2006 | Vrancic et al. | |
| 2006/0069603 A1 | 3/2006 | Williams et al. | |
| 2006/0074732 A1 | 4/2006 | Shukla et al. | |
| 2006/0173985 A1 | 8/2006 | Moore | |
| 2006/0195819 A1 | 8/2006 | Chory et al. | |
| 2006/0206440 A1 | 9/2006 | Anderson et al. | |
| 2006/0224702 A1 | 10/2006 | Schmidt et al. | |
| 2006/0224750 A1 | 10/2006 | Davies et al. | |
| 2006/0230432 A1 | 10/2006 | Lee et al. | |
| 2006/0294499 A1 | 12/2006 | Shim | |
| 2007/0174393 A1 | 7/2007 | Bosschaert et al. | |
| 2007/0192678 A1 | 8/2007 | Tang et al. | |
| 2007/0268300 A1 | 11/2007 | Janet et al. | |
| 2008/0046861 A1 | 2/2008 | Grieser | |
| 2008/0059220 A1 | 3/2008 | Roth et al. | |
| 2008/0120574 A1 | 5/2008 | Heredia et al. | |
| 2008/0120593 A1 | 5/2008 | Keren et al. | |
| 2008/0126932 A1 | 5/2008 | Elad et al. | |
| 2008/0127052 A1 | 5/2008 | Rostoker | |
| 2008/0141237 A1 | 6/2008 | Elad et al. | |
| 2008/0148346 A1 | 6/2008 | Gill et al. | |
| 2008/0163164 A1 | 7/2008 | Chowdhary et al. | |
| 2008/0172270 A1 | 7/2008 | Eckenroth | |
| 2008/0307369 A1 | 12/2008 | Liu et al. | |
| 2009/0262131 A1 | 10/2009 | Suntinger et al. | |
| 2009/0276771 A1 | 11/2009 | Nickolov et al. | |
| 2009/0319832 A1 | 12/2009 | Zhang et al. | |
| 2009/0326997 A1 | 12/2009 | Becker et al. | |
| 2010/0017853 A1 | 1/2010 | Readshaw | |
| 2010/0030718 A1 | 2/2010 | Anderson et al. | |
| 2010/0304992 A1 | 12/2010 | An et al. | |

OTHER PUBLICATIONS

"Agitator," online retrieved on Feb. 15, 2005) Retrieved from the internet ,URL:http://www.agitar.com/products/000024.html., pp. 1-5, Agitar Software, Inc.

"AmberPoint Express", (online, retrieved on Dec. 23, 2004), Retrieved from the internet ,URL:http://www.amberpoint.com/solutions/express_print.html., pp. 1-2, AmberPoint Solutions.

"Extensible Markup Language (XML) 1.0 (Second Edition)", Oct. 6, 2000 (online, retrieved on Aug. 3, 2006), Retrieved from the internet <URL:htt;://www.w3.org/TR/2000/REC-xml-20001006>, pp. 1-43, W3C.

"Interoperability: The Key to Quality Web Services," Mar. 2004 (online) retrieved on Nov. 17, 2004; Retrived from the Internet <URL:http://www.mindreef.com/products.whitepapers/whitepaper-2html>, pp. 1-9, Mindreef, Inc., (no longer available on the internet).

"ProactiveNet 6.0 Optimize Application Performance to Meet Business Objectives" 2004, pp. 1-4, ProactiveNet, Inc., CA.

Abbreviated Examination Report, GB0517847.0, Dec. 1, 2005 (1 page).

Barton, J.J. et al., "SOAP Messages with Attachments," World Wide Web Consortium, W3C Note, Dec. 11, 2000, retrieved online on Jul. 24, 2003, from <URL:http://www.w3.org/TR/SOAP-attachments> (8 pages).

Bilorusets et al.; Web Services Reliable Messaging Protocol (WS-ReliableMessaging); Feb. 2005; http://msdn.microsoft.com/library/en-us/dnglobspec/html/WS-ReliableMessaging.pdf (40 pages).

Biron P.V. et al., "XML Schema Part 2: Datatypes," World Wide Web Consortium, W3C Recommendation, May 2, 2001, retrieved online Jul. 11, 2003, retrieved from <URL:http://www.w3.org/TR/xmischema-2> (116 pages).

Box, D. et al., "Simple Object Access Protocol (SOAP) 1. 1," World Wide Web Consortium, W3C Note, May 8, 2000, retrieved online on Jul. 23, 2003, retrieved from <URL:http://www.w3.org.TR/2000/NOTE-SOAP-20000508/> (28 pages).

Bray, T. et al.. Extensible Markup Language (XML) 1.0 (Second Edition), World Wide Web Consortium, W3c Recommendation, Oct. 6, 2001, retrieved online on Jul. 11, 2003, retrieved from RL:http://www.w3.org/TR/REC-xml> (44 pages).

Christensen, E. et al., "Web Services Description Language (WSDL) 1.1," World Wide Web Consortium, W3C Note, Mar. 15, 2001, retrieved online on Jul. 11, 2003, retrieved from <URL:http://www.w3.org.TR/wsdl> (40 pages).

Clark, J. et al., "XML Path Language (Xpath)," World Wide Web Consortium, W3C Recommendation, Nov. 16, 1999, retrieved online on Jul. 11, 2003, retrieved from <URL:http://www.w3.org/TR/xpath> (119 pages).

Clark, J., "XSL Transformations (XSLT) Version 1.0," World Wide Consortium W3C Recommendation, Nov. 16, 1999, retrieved online on Jul. 11, 2003, retrieved from <URL:http://www.w3.org/TRxsit> (28 pages).

Copyright Co OASIS, 2001, "Oasis/ebXML Registry Information Model v1.0 DRAFT, OASIS/ebXML Registry Technical Committee," retrieved online on Jun. 27, 2001, retrieved from <URL:http://www.oasis-open.org/committees/regrap/documents/rimv1.0.doc> (43 pages).

Copyright © UN/CEFACT and OASIS, 2001, "Message Service Specification, ebXML Transport, Routing & Packaging, Version 1.0," retrieved online on May 11, 2001, retrieved from <URL:http://www.ebxml.org/specs/ebMS.pdf> (75 pages).

Corba Messaging 22: Common Object Request Broker Architecture (CORBA), v3.0.3; Mar. 2004: http://www.omg.org/docs/formal/04-03-12.pdf (p. 85, total: 100 pages).

Fallside, D.C., "XML Schema Part 0: Primer," World Wide Web Consortium, W3C Recommendation, May 2, 2001, retrieved on Jul. 11, 2003, retrieved from <URL:http://www.w3.org/TR/xmischema-0> (57 pages).

Final Office Action dated Oct. 18, 2005 from U.S. Appl. No. 10/015,502 (29 pages).

International Search Report issued for PCT/USO4/03674, dated Oct. 13, 2004 (1 page).

International Search Report/Written Opinion issued for PCT/US08/52928 dated Jul. 25, 2008 (8 pages).

International Search Report/Written Opinion issued for PCT/US08/52928, dated Jul. 25, 2008 (8 pages).

Martin, B. "Build distributed applications with Java and XML," Feb. 2000, (online, retrieved on Jun. 10, 2005), Retrieved from the internet ,URL: http://www.javaworld.com/javaworld/jw-02-2000/JW-02-ssj-xml_phtml>, pp. 103 Java World.

Merrick, P. et al., "Web Interface Definition Language (WIDL)," World Wide Web Consortium, Submitted to W3C Sep. 22, 1997, ® 1997, webMethods, Inc., retrieved online on Aug. 11, 2003, retrieved from <URL•http://www.w3.org/TR/NOTE-widl> (16 pages).

Mitchko, J. "Mindreef SOAPscope 1.0", (online, retrieved on Sep. 27, 2004), retrieved from the internet <URL:http://www.sys-con.com/webservices/articleprint.cfm?id+597., pp. 1-3, SYS-CON Media, Inc.

Notification Service Specification; Object Management Group; Version 1.1 formal/Apr. 10, 2013; Oct. 2004; http://www.omg.org/docs/formal/04-10-13.pdf (118 pages).

Office Action dated Aug. 5, 2005 from U.S. Appl. No. 10/015,501 (8 pages).

Office Action dated Mar. 28, 2005, issued in U.S. Appl. No. 10/015,502 (26 pages).

Progress Software, Apama Event Modeler v2.0 Professional Edition & Client Edition, Published Apr. 1, 2005 (selected pages, United Kingdom of Great Britain (13 pages).

Schaffner, Brian, "Debug SOAP apps with Apache TCP Tunnel/Monitor", Jan. 30, 2003 (online, retrieved on Dec. 23, 2004), Retrieved from the internet ,URL:hhttp://www.builder.com.com/5102-6389-1049605.html., pp. 1-2, CNET Networks, Inc.

Thompson, H.S. et al., "XML Schema Part 1: Structures," World Wide Web Consortium, W3C Recommendation, May 2, 2001, retrieved on Jul. 11, 2003, retrieved from <URL:http://www.w3.org/TR/xmischema-1> (151 pages).

Transmission Control Protocol; Darpa Internet Program Protocol Specification; Sep. 1981; http://www.ietf.org/rfc/rfc0793.txt?number=793 (84 pages).

Web Services Reliable Messaging TC WS-Reliability 1.1; OASIS Open 2003-2004; Oasis Standard , Nov. 15, 2004; http://docs.oasis-open.org/wsrm/ws-reliability/v1.1/wsrm-ws_reliability-1.1-spec-os.pdf (74 pages).

* cited by examiner

MESSAGE HANDLING

REFERENCE TO RELATED APPLICATIONS

This application claims priority to U.S. Provisional Application Ser. No. 60/257,313, filed Dec. 20, 2000, entitled "Message Handling".

BACKGROUND

Applications running on different network computers often share information. For example, an application running at one computer may feed stock market data to applications at remote computers. To share information, applications often use a messaging system. A messaging system handles a wide variety of tasks associated with application and network communication. These systems often ease application development by shielding programmers from the details of message handling.

One type of messaging system is known as "message-oriented middleware." Essentially, message-oriented middleware systems receive messages from one application and store these messages until retrieved by another application. This scheme can free applications to perform other operations until they choose to receive a message.

Some messages do not require reliable transmission. For example, the loss of a message containing a stock quote may not be of particular concern if other messages with the quote quickly follow. More critical data exchanges, however, may require greater reliability. Thus, many messaging systems support "guaranteed messages" that the messaging system promises not to lose. Typically, after receiving a guaranteed message, message-oriented middleware systems transmit an acknowledgment message to the sending application indicating that from then on, the system will not lose the message. To provide this guarantee, many messaging systems save guaranteed messages in persistent storage such as a hard disk or other non-volatile storage medium. Thus, even in the event of a messaging system problem, such as a system crash, the system can still access and deliver the guaranteed messages when the system resumes operation.

SUMMARY

In general, in one aspect, the disclosure describes a method of handling messages received at a messaging system server. The method includes storing, in non-persistent storage, messages received from at least one client, removing delivered messages from the non-persistent storage, and saving messages stored in the non-persistent storage to persistent storage after a delay interval.

Embodiments many include one or more of the following features. The storing, removing, and saving may occur concurrently. Storing in non-persistent storage may include storing in a log queue. The messages may be guaranteed messages. The messaging system may be a message-oriented middleware system.

The method may further include transmitting an acknowledgement message that indicates that the received message will not be lost by the server in the case of server failure. Transmitting may include transmitting the acknowledgment message to the client for a delivered message or storage of the message in persistent storage.

The method may further include determining the delay interval. For example, such determining may occur by determining at least one metric based on messages handled by the server and determining the delay interval based on the at least one metric. The metric may include a metric based on a number of sending clients using the server to deliver messages. Determining the interval delay may include dynamically determining the delay.

In general, in another aspect, the disclosure describes a method of handling guaranteed messages received at a message-orient middleware server over a network. The method includes storing, in a log queue in non-persistent storage, guaranteed messages received from at least one client as the guaranteed messages are received. The method also includes removing guaranteed messages from the non-persistent storage as the guaranteed messages are delivered, dynamically determining a delay time period, and storing guaranteed messages stored in the non-persistent storage in persistent storage after the determined delay period. The method also includes transmitting a guarantee acknowledgement message to a client that sent a received message indicating that the message will not be lost by the server.

Embodiments may include one or more of the following features. Transmitting the guarantee acknowledgement message may include transmitting the guarantee acknowledgement message for a delivered guaranteed message if the guaranteed message is not persistently stored, the guarantee acknowledgement message otherwise being transmitted when the message is persistently stored.

In general, in another aspect, the disclosure describes a computer program product, disposed on a computer readable medium, for handling messages received at a server. The computer program includes instructions for causing a server processor to store, in a non-persistent storage, messages received from at least one client as the messages are received, remove messages from the non-persistent storage as the messages are delivered, and save messages stored in the non-persistent storage to persistent storage after a delay period.

In general, in another aspect, the disclosure describes a message oriented middleware server. The server includes non-persistent storage, persistent storage, at least one processor, and instructions. The instructions cause the server processor to store, in the non-persistent storage, messages received from at least one client as the messages are received, remove messages from the non-persistent storage as the messages are delivered, and save messages stored in the non-persistent storage to persistent storage after a delay interval.

Advantages of the techniques described herein will become apparent in view of the following description, including the figures.

DETAILED DESCRIPTION

FIGS. 1 to 6 illustrate operation of a messaging system 100 that offers high performance and can reduce the resources needed to handle messaging between different applications 108-114. As shown, the server 100 includes both persistent storage 106 (i.e., non-volatile storage) and non-persistent storage 102 (i.e., volatile storage). The different types of storage 102, 106 offer different storage features. For example, while data stored in persistent storage 106 typically survives system 100 crashes, non-persistent storage 104 usually offers much faster access to data. Or, more concretely, storing and retrieving data to and from a hard disk, an example of persistent storage 106, usually takes much longer than storing and retrieving data from R.A.M. (Random Access Memory), an example of non-persistent storage 102.

To improve message handling, for example, of guaranteed messages, the system 100 shown can balance the performance cost of storing messages in persistent storage 106 with the protection offered by doing so. For example, in the case of guaranteed messages, the messaging server 100 can add the messages to a queue 104, known as a log queue, in non-persistent storage 102. The system 100 continually removes messages from the log queue 104 as the server 100 delivers the messages. After a delay interval, the system 100 begins saving undelivered guaranteed messages to persistent storage 106. Since the system 100 will often deliver many guaranteed messages before expiration of the delay interval, the system 100 can avoid saving a large number guaranteed message to persistent storage 106. Storing fewer messages in persistent storage 106 can increase the message handling speed of the system 100 and can reduce the amount of persistent storage 106 needed. For guaranteed messages that remain undelivered beyond an expiration of a delay interval, however, the system 100 still provides the reliability of persistent storage.

To guarantee a message, the system 100 transmits a guarantee acknowledgement message to a message sender after message delivery or persistent storage of the message. Until the system 100 transmits a guarantee acknowledgement message, the system 100 has not guaranteed that the system 100 will not lose the sender's message. Thus, in the event the system 100 crashes before delivery or persistent storage of a message, the server 100 will not transmit an acknowledgement message guaranteeing the sender's message.

Figure 1:
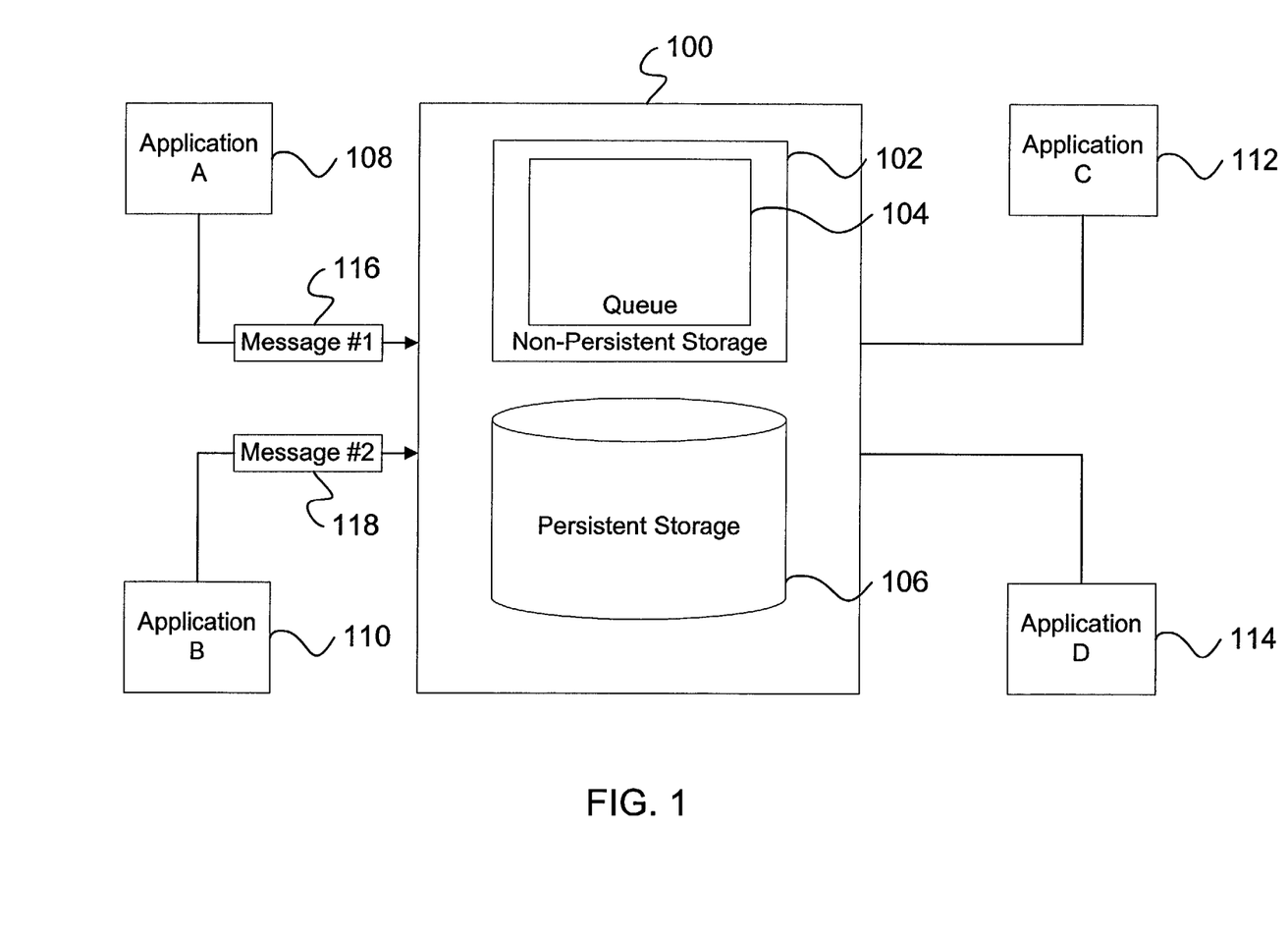
FIGS. 1 to 6 are diagrams illustrating operation of a messaging system.

In greater detail, FIG. 1 shows a messaging system 100 and four different client applications 108-110. The messaging system 100 and clients 108-110 may communicate over a network such as the Internet.

As shown, two different clients, application A 108 and application B 110, send messages 116, 118 to the messaging system server 100. The messages 116, 118 may be designated as guaranteed messages, for example, by information included in the messages 116, 118. Though client applications 108, 110 may refrain from sending additional messages until receiving an acknowledgement of a guaranteed message from the server 100, the server 100 awaits either delivery or persistent storage of the message before transmitting the guarantee acknowledgement.

Figure 2:
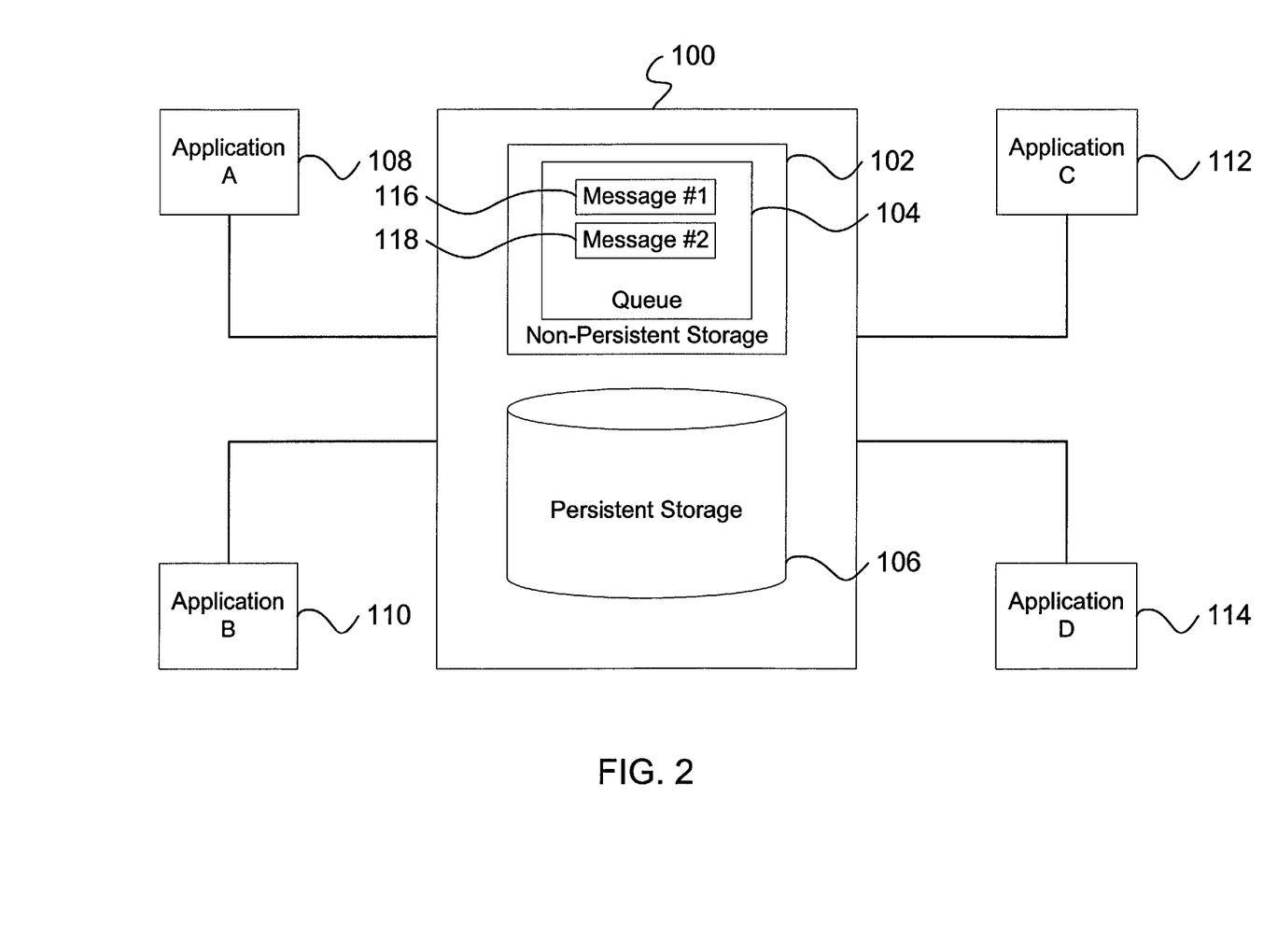

As shown in FIG. 2, the server 100 adds the received messages 116, 118 to the log queue 104 in non-persistent storage 102. Such adding may feature a copy of the message. Alternatively, adding the message to the log queue 104 may feature a reference or pointer to a memory location storing the message.

The server 100 may feature other queues (not shown). For example, in JMS (Java Messaging Service), a standard design for message-oriented middleware, senders and receivers communicate via queues. For instance, a sending application may send a message specifying a queue. A receiving application requests a message from the same queue. The messaging system 100 may handle communication by such queuing or use a wide variety of other communication techniques such as topic-based message handling using publish/subscribe, and so forth. Regardless of the technique, however, the server 100 can maintain the log queue 104 described herein.

Figure 3:
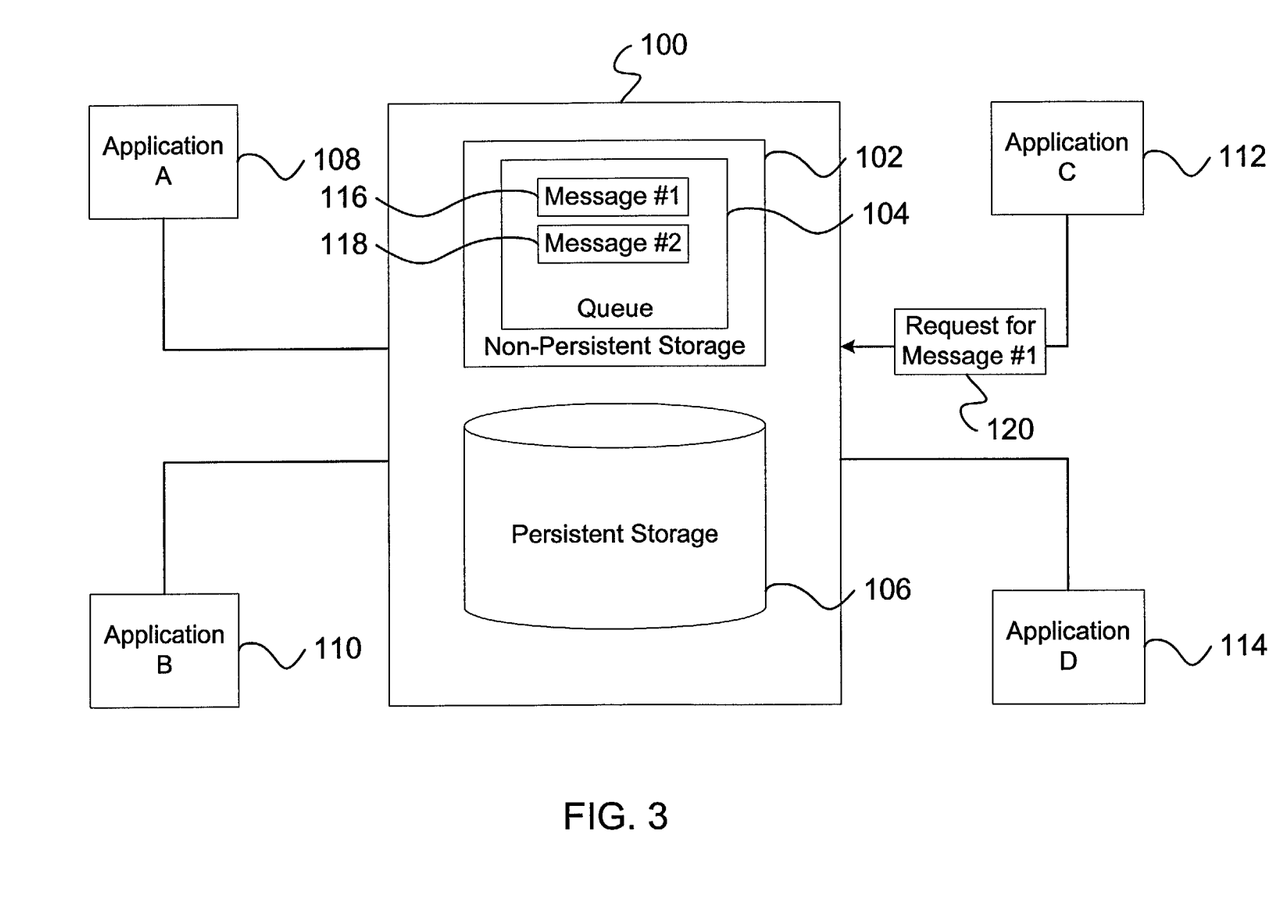
Figure 4:
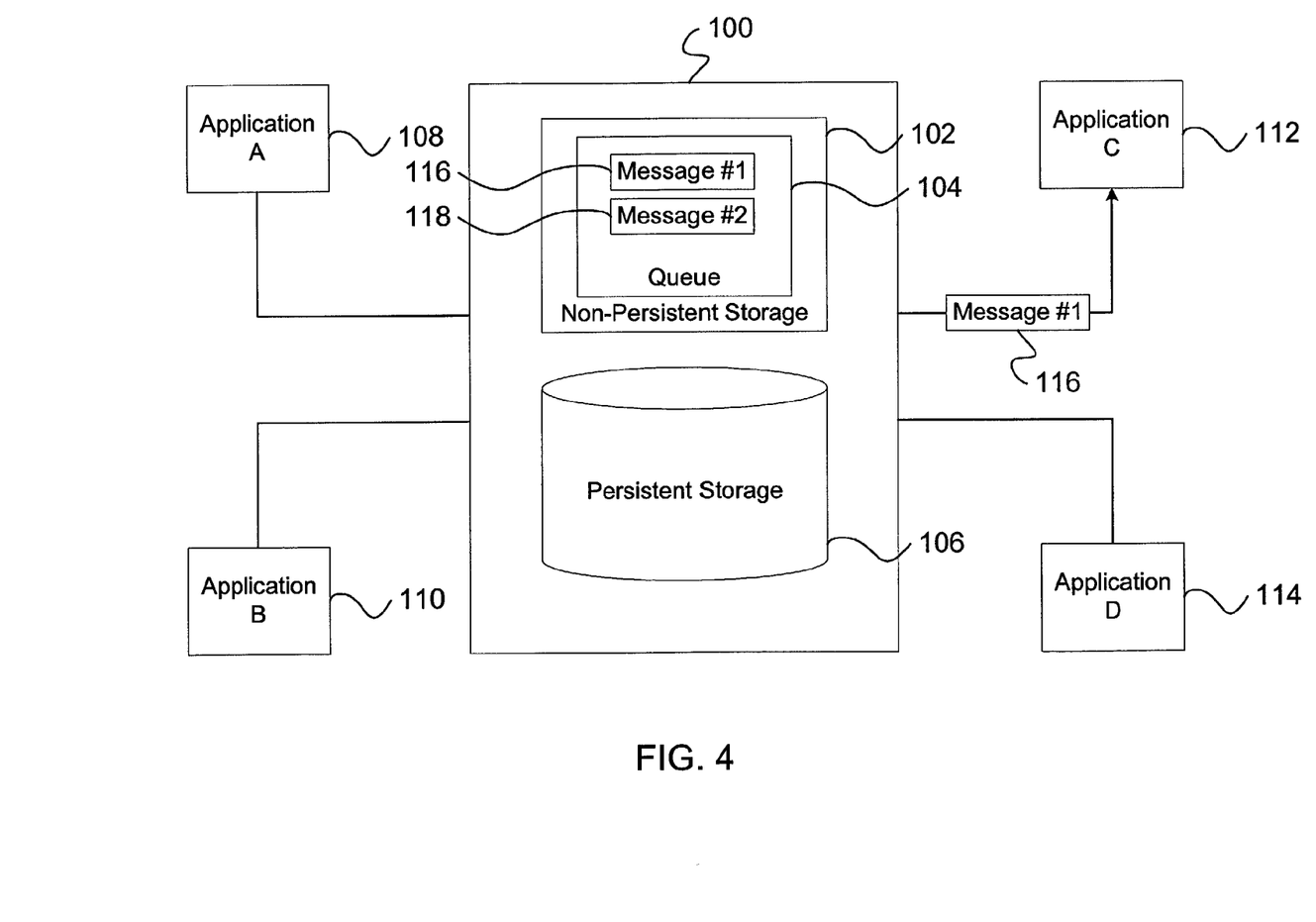

As shown in FIG. 3, application C 112 transmits a request 120 for delivery of message #1 116. Again, how the application 112 makes such a request depends on the communication techniques supported by the server 100. As shown in FIG. 4, the server 100 transmits message #1 116 to application C 112.

Figure 5:
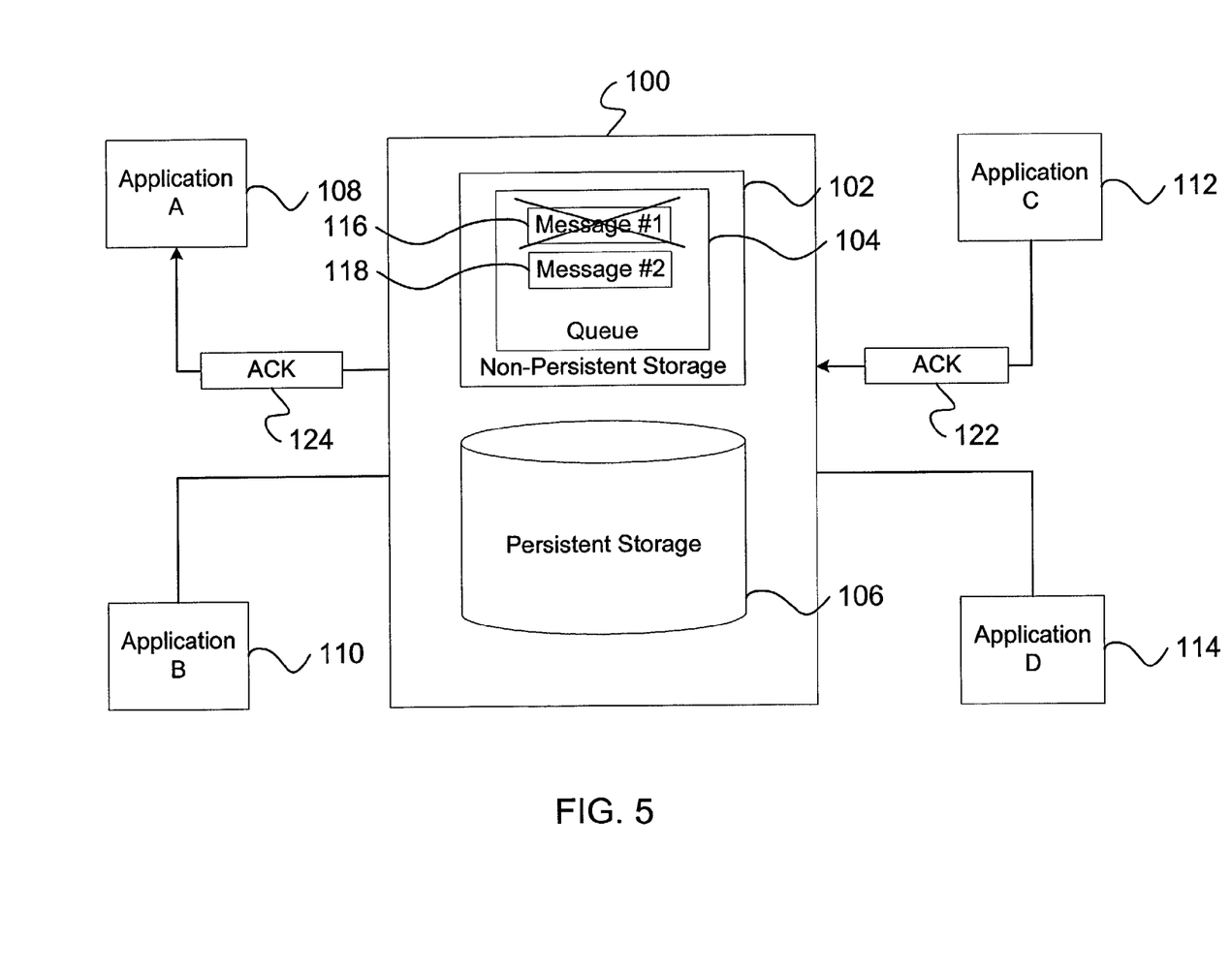

As shown in FIG. 5, after receipt of message #1 116, application C 112 transmits a receipt acknowledgement message 122 back to the server 100. The system 100, in turn, transmits a guarantee acknowledgement message 124 to the sending client, application A 124, since delivery of the message 116 enables the system 100 to guarantee that it will not lose the message 116 prior to delivery. The system 100 may also transmit a message (not shown) indicating confirmed receipt of a message by a receiving application. As shown, the system 100 removes message #1 116 from the log queue 104 by deleting the message, message reference, or otherwise indicating that the server 100 need not save the message 116 to persistent storage 106.

Figure 6:
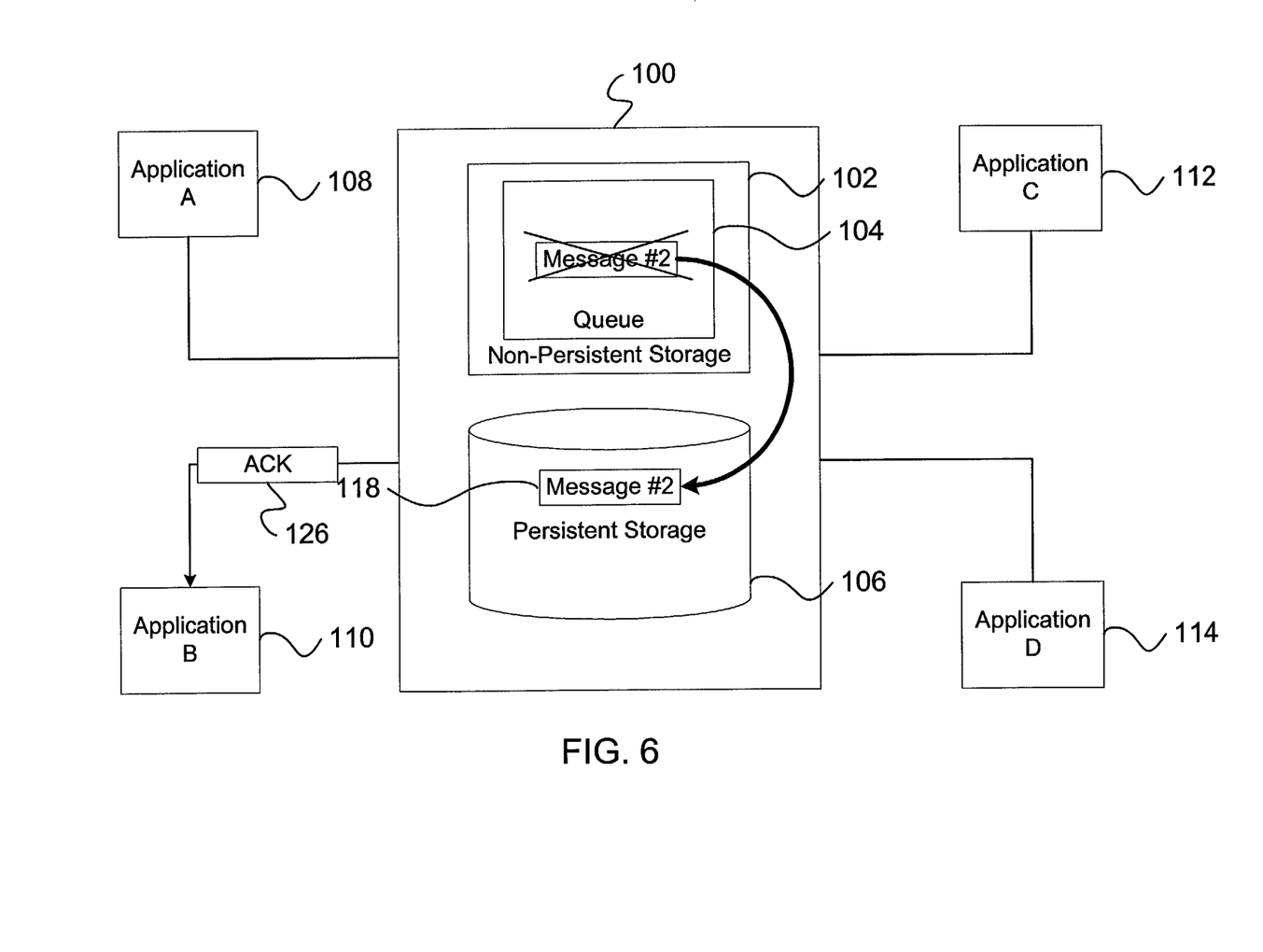

As shown in FIG. 6, after a delay interval, the server 100 saves guaranteed messages, such as message #2 118, remaining in the log queue 104 to persistent storage 106. After saving the message 118 to persistent storage, the server 100 can remove the message 118 from the log queue 104. As shown, the server 100 can then transmit a guarantee acknowledgment message 126 to the client application 110 that sent the message 118 that has since been saved to persistent storage 106. Again, saving the message 118 to persistent storage 106 enables the server 100 to guarantee that the server 100 will not lose the message 118. After saving message 118, and, potentially, other guaranteed messages in the log-queue 104, the server 100 can begin waiting another delay interval before, again, saving messages to persistent storage 106. Since the server 100 may deliver many guaranteed messages during the delay, the delay can reduce messages written to the persistent storage 106. This reduced file activity can free the server 100 to devote resources to other tasks such as message delivery and obtain a higher rate of message delivery overall.

The server 100 can retrieve persistently stored messages in the event of a problem such as a system 100 crash. For example, the server 100 can retrieve the persistently stored messages and replace them on an appropriate JMS queue. However, when the server 100 finally delivers messages retrieved from persistent storage 106, the server 100 may not send another guarantee acknowledgement message since the server 100 did so when storing the message in persistent storage 106.

Though FIGS. 1 to 6 illustrate server 100 operation as a series of stages, many of the operations shown can occur concurrently. For example, the server 100 may continually receive new messages for delivery and add these messages to the log-queue 104 as the server 100 simultaneously sends messages on to receiving applications. As this receiving and sending continues, the server 100 can intermittently save messages in the log queue 104 to persistent storage 106. Even as the server 100 saves messages to persistent storage 106, the server 100 may continue to add newly received messages to log queue 104 and remove delivered messages from the log queue 104. To ensure that messages wait in the log queue 104 for at some interval before being persistently stored, messages added to the log queue 104 after the server 100 begins saving messages to persistent storage may not be saved to persistent storage 106 until expiration of the next delay interval.

Figure 7:
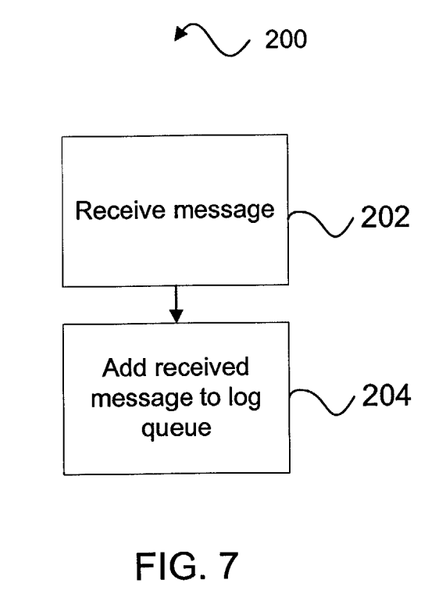
FIGS. 7 to 9 are flow-charts illustrating operation of a messaging system.
Figure 8:
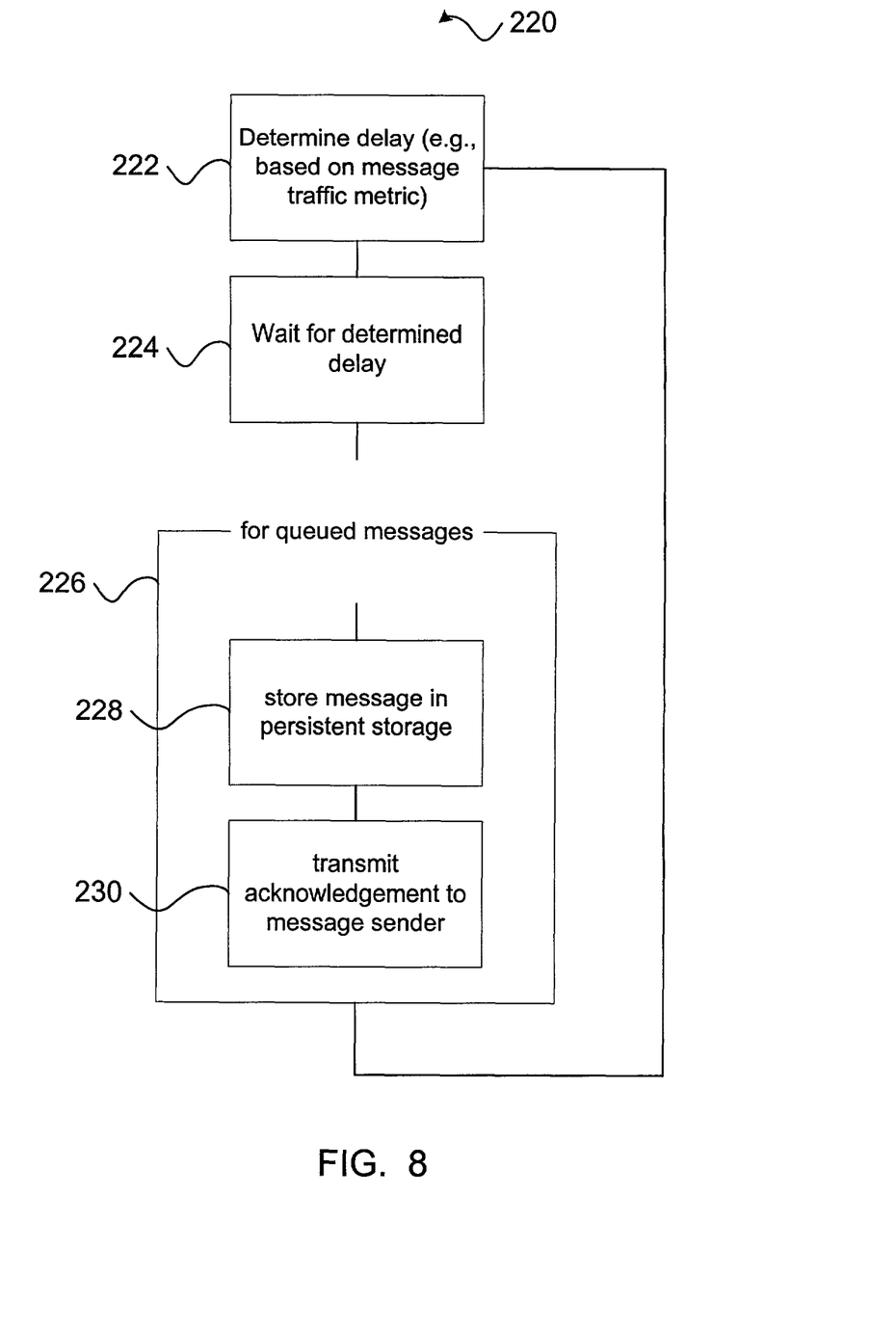
Figure 9:
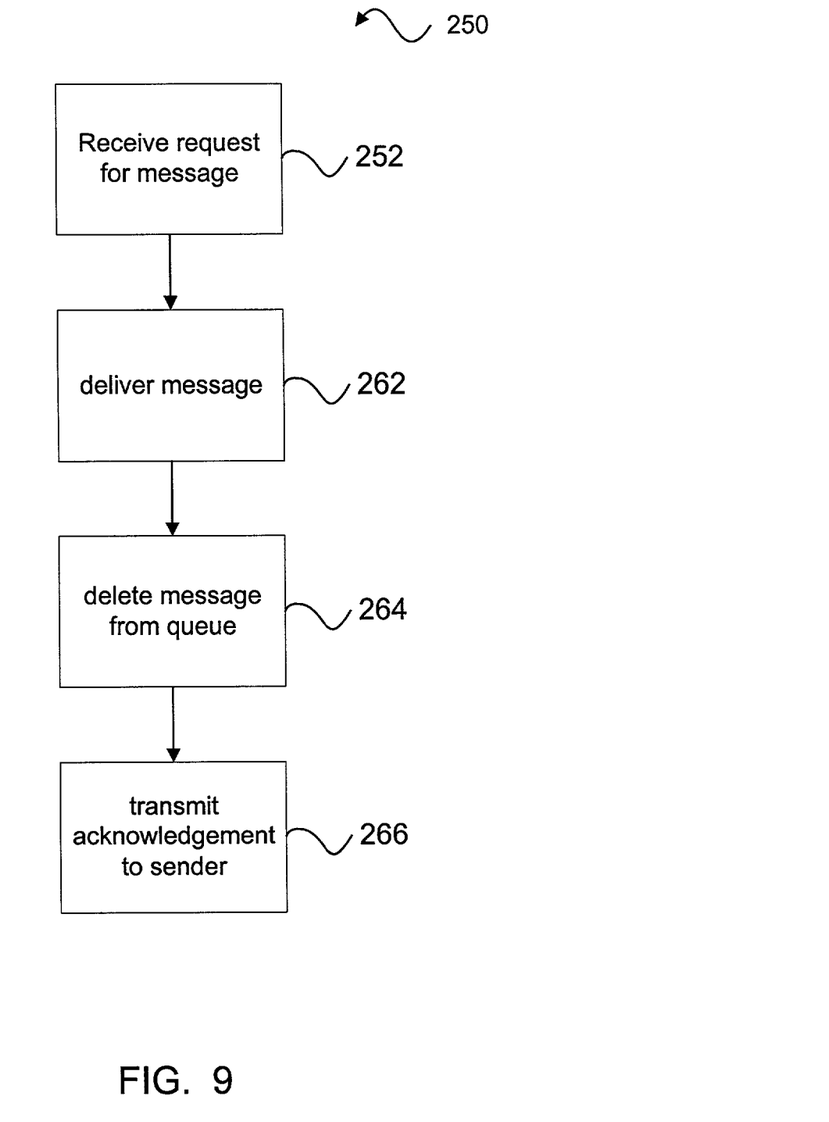

FIGS. 7 to 9 illustrate a sample implementation that features different processing threads provided by the messaging server 100. Again, the server 100 can execute these threads concurrently. It should be noted that the system may be implemented in a wide variety of ways. Other implementations need not use threads. For example, a "monolithic" procedure may handle the tasks shown as being performed by different threads.

In greater detail, FIG. 7 illustrates a thread 200 that processes messages received 202 from client applications. The thread 200 adds 204 the received messages to the log queue 104 described above.

FIG. 8 illustrates a log flush thread 220 that saves messages in the log-queue to persistent storage 106 after a delay interval. The server 100 may use the same, constant delay interval time and again. For example, the server 100 can determine a delay interval by accessing a memory location storing a user specified delay. Alternatively, as shown, the thread 220 can dynamically determine 222 a delay interval, for example, based on messages handled by the server 100.

In practice, a variable delay can enhance overall message throughput as the messaging environment changes. For example, a variable delay can improve performance when the number of messaging clients changes over time. That is, at low client counts, a persistent storage sub-system 106 may be fast enough to satisfy message requests. Thus, in such environments, immediately storing messages in persistent storage 106 and sending a guarantee acknowledgment message enables a sending client awaiting acknowledgment to proceed sooner than a deferred delivery of the acknowledgment message might allow. Thus, where few clients are sending and/or receiving messages, a small delay may improve overall system performance.

When a system 100 handles messages for a large number of senders and receivers, reducing the overhead of accessing persistent storage for the increased number of messages 106 can improve system 100 performance. Thus, a longer delay can increase message delivery speed by allowing more time for delivery of messages before saving them to persistent storage 106.

An appropriate amount of delay, however, may also depend on the current messaging environment (e.g., number of clients, average message size) of the server 100 and attributes of the storage system (e.g., the speed of access to persistent 106 and non-persistent storage 102, and the amount of persistent 106 and non-persistent storage 102 available).

In some embodiments, a server 100 determines 222 a variable delay based on one or more metrics, such as metrics based on message traffic handled by the server 100. For example, a metric may correspond to the number of different clients sending and/or receiving messages. For instance, in the case of a metric based on the number of clients sending messages, a process can determine a sender identifier of messages received, for example, as received messages are added to the log queue 104. The server 100 adds the identifier to a list such as an array of configurable length or a linked list. Because the list may hold a limited number of entries, the oldest entry may be discarded as the new entry is added. The server 100 may use the list to determine the number of sending clients for a given set of messages in the log queue 104. Based on the number of different sending clients, the server 100 can select a delay interval varying between zero for a single client and a maximum value when the entire list contains unique entries. The upper and lower bounds of the delay value may be configured. Additionally, the delay value may vary linearly or non-linearly, relative to the client metric.

The server 100 can determine a wide variety of other metrics. For example, the server 100 may determine a metric based on the average message size for messages currently added to the log queue 104. For a metric indicating a larger average message size, the server 100 may reduce the delay interval. Additionally, yet another metric may reflect the speed of persistent storage.

After, potentially, determining a delay interval 222, the thread 220 can suspend or otherwise wait 224 for the delay interval to expire. When the interval expires, the thread 220 can begin saving log-queued messages to persistent storage 106. In some embodiments, before the thread 220 begins saving messages to persistent storage 106, the thread 220 can identify the last position of the log queue. The thread 220 can be configured to not save messages after this position. Thus, although additional messages may be added to the log queue, the thread 220 will save those messages placed in the log-queue before the delay interval expired. Thus, messages received during the save operation may remain on the log-queue, if not delivered, until expiration of the next interval.

For messages in the queue requiring persistent storage (e.g., guaranteed messages) 226, the thread 220 can store 228 the messages in persistent storage and transmit 230 guarantee acknowledgement messages to the respective message senders. After handling the messages in the log-queue 104, the thread 220 (if so configured) can again determine a new delay interval and suspend operation as newly received messages accumulate in the log queue 104 before resumption of the thread 220 after the determined interval.

FIG. 9 illustrates a process 250 for delivering messages. As shown, the process 250 receives a message request 252 from a client application. Such a request may include different information depending on the type of communication (e.g., queue-based, topic-based for publish/subscribe, and so forth). The process 250 can then deliver the message 262. Depending on the system 100, the system 100 may deem the message delivered based on different criteria. For example, the system 100 may not consider a message delivered until receipt of an acknowledgement message from the recipient. Alternatively, the process 250 may deem a message delivered when transmitted, or even when the request for the message arrives. After message delivery 262, the illustrated process 250 removes 264 (e.g., delete or mark as delivered) the delivered message from the queue 104 and transmits 266 a "guarantee" acknowledgment message to the message's original sender.

The techniques described herein are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices.

The program(s) may be implemented in high level procedural or object oriented programming language to communicate with a computer system. However, the programs can be implemented in assembly or machine language, if desired. In any case the language may be compiled or interpreted language.

The computer program(s) may be stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method of handling a message received at a messaging system server having a processor, the method comprising:
   storing at the messaging server by the processor, in non-persistent storage, the message;
   determining by the processor whether the message has been delivered;
   if the message has been delivered, removing by the processor the message from the non-persistent storage; and
   after a configurable delay interval has elapsed and if the message has not been removed from the non-persistent storage, saving by the processor the message to persistent storage so that the message can be retrieved and delivered.

2. The method of claim 1, wherein storing in the non-persistent storage comprises storing in a log queue.

3. The method of claim 1, further comprising transmitting an acknowledgement message to a client that sent the received message, the acknowledgement message indicating that the received message will not be lost by the server in the case of server failure.

4. The method of claim 3, wherein transmitting the acknowledgment message to the client comprises transmitting the acknowledgement message to the client for successful delivery of the received message.

5. The method of claim 3, wherein transmitting the acknowledgment message to the client comprises transmitting the acknowledgment message to the client for storage of the received message in persistent storage.

6. The method of claim 1, further comprising determining the delay interval.

7. The method of claim 6, wherein determining the delay interval comprises:
   determining at least one metric based on messages handled by the server; and
   determining the delay interval based on the at least one metric.

8. The method of claim 7, wherein the metric comprises a metric based on a number of sending clients using the server to deliver messages.

9. The method of claim 6, wherein determining the delay interval comprises dynamically determining the delay.

10. The method of claim 1, wherein the message was received over a communications network.

11. The method of claim 1,
   wherein the message comprises a guaranteed message; and
   wherein the messaging system comprises a message-oriented middleware system.

12. A method of handling guaranteed messages received at a message-oriented middleware server having a processor over a network, the method comprising:
   storing at the message-oriented middleware server by the processor, in a log queue in non-persistent storage, guaranteed messages received from at least one client as the guaranteed messages are received;
   determining by the processor whether one of the guaranteed messages has been delivered;
   if the guaranteed message has been delivered, removing by the processor the message from the non-persistent storage;
   dynamically determining by the processor a delay time period;
   after the determined delay period has elapsed and if the message has not been removed from the non-persistent storage, saving by the processor the guaranteed messages to persistent storage so that the guaranteed messages can be retrieved and delivered; and
   transmitting a guaranteed acknowledgement message to a client that sent the received guaranteed message, the guaranteed acknowledgement message indicating that the received guaranteed message will not be lost by the server.

13. The method of claim 12, wherein transmitting the guarantee acknowledgement message comprises:
   if the guaranteed message was successfully delivered, transmitting the guarantee acknowledgement message; and
   if the guaranteed message was not successfully delivered, transmitting the guarantee acknowledgement message when the guaranteed message is persistently stored.

14. The method of claim 12, wherein dynamically determining the delay time period comprises:
   determining a metric based on messages handled by the server; and
   determining the delay time period based on the determined metric.

15. A computer program product, disposed on a non-transitory computer readable medium, for handling messages received at a server, the computer program including instructions for causing a server processor to:
   store, in non-persistent storage, messages received from at least one client as the messages are received;
   determine whether one of the messages has been delivered;
   if the message has been delivered, remove the message from the non-persistent storage; and
   after a configurable delay interval has elapsed and if the message has not been removed from the non-persistent storage, save the message to persistent storage so that the message can be retrieved and delivered.

16. The computer program of claim 15, wherein the instructions for causing the server processor to store messages in the non-persistent storage comprise instructions for causing the server processor to store the messages in a log queue.

17. The computer program of claim 15, further comprising instructions for causing the server processor to transmit an acknowledgement message to a client that sent the received message, the acknowledgement message indicating that the received message will not be lost by the server.

18. The computer program of claim 17, wherein the instructions for causing the server processor to transmit the acknowledgment message to the client comprise instructions for causing the server processor to transmit the acknowledgment message to the client for a message saved from non-persistent storage to persistent storage.

19. The computer program of claim 15, further comprising instructions for causing the server processor to determine the delay.

20. The computer program of claim 19, wherein the instructions for causing the server processor to determine the delay comprise instructions for causing the server processor to:
   determine at least one metric based on the received messages; and
   determine the delay based on the at least one metric.

21. The computer program of claim 20, wherein the metric comprises a metric based on a number of clients using the server to deliver messages.

22. The computer program of claim 15, wherein the instructions for causing the processor to determine the delay comprise instructions for causing the processor to dynamically determine the delay.

23. A message oriented middleware server, the server comprising:

non-persistent storage;
   persistent storage;
   at least one processor; and
   instructions for causing the server processor to:
      store, in the non-persistent storage, messages received from at least one client as the messages are received;
      determine whether one of the messages has been delivered;
      if the message has been delivered, remove the message from the non-persistent storage; and
      after a configurable delay period has elapsed and if the message has not been removed from the non-persistent storage, save the message to persistent storage so that the message can be retrieved and delivered.

24. The server of claim 23, wherein the instructions for causing the server processor to store the messages in the non-persistent storage comprise instructions for causing the server processor to store the messages in a log queue.

25. The server of claim 23, further comprising instructions for causing the server processor to transmit an acknowledgment message to a client that sent the received message, the acknowledgment message indicating that the received message will not be lost by the server.

26. The server of claim 25, wherein the server instructions for causing the server processor to transmit the acknowledgment message to the client comprise instructions for causing the server processor to transmit the acknowledgment message to the client as the message is stored from nonpersistent storage to persistent storage.

27. The server of claim 23, further comprising instructions for causing the server processor to determine the delay.

28. The server of claim 27, wherein the instructions for causing the server processor to determine the delay comprise instructions for causing the server processor to:
   determine at least one metric based on the received messages; and
   determine the delay based on the at least one metric.

29. The server of claim 28, wherein the metric comprises a metric based on a number of clients using the server to deliver messages.

30. The server of claim 23, wherein the instructions for causing the processor to determine the delay comprise instructions for causing the processor to dynamically determine the delay.

\* \* \* \* \*